(12) United States Patent
Pahan

(10) Patent No.: US 12,478,598 B2
(45) Date of Patent: Nov. 25, 2025

(54) COMPOSITIONS INCLUDING CINNAMIC ACID AND METHODS OF USE THEREOF

(71) Applicant: Rush University Medical Center, Chicago, IL (US)

(72) Inventor: Kalipada Pahan, Skokie, IL (US)

(73) Assignee: Rush University Medical Center, Chicago, IL (US)

( * ) Notice: Subject to any disclaimer, the term of this patent is extended or adjusted under 35 U.S.C. 154(b) by 954 days.

(21) Appl. No.: 17/433,730

(22) PCT Filed: Feb. 25, 2020

(86) PCT No.: PCT/US2020/019568
§ 371 (c)(1),
(2) Date: Aug. 25, 2021

(87) PCT Pub. No.: WO2020/176432
PCT Pub. Date: Sep. 3, 2020

(65) Prior Publication Data
US 2022/0133664 A1    May 5, 2022

Related U.S. Application Data

(60) Provisional application No. 62/810,055, filed on Feb. 25, 2019.

(51) Int. Cl.
*A61K 31/192* (2006.01)
*A61K 31/235* (2006.01)

(52) U.S. Cl.
CPC .......... *A61K 31/192* (2013.01); *A61K 31/235* (2013.01)

(58) Field of Classification Search
None
See application file for complete search history.

(56) References Cited

U.S. PATENT DOCUMENTS

| | | | |
|---|---|---|---|
| 7,799,830 B2 | 9/2010 | Kim et al. | |
| 11,304,923 B2 * | 4/2022 | Pahan | ........................ A61P 3/10 |
| 2005/0203180 A1 | 9/2005 | Kim et al. | |
| 2016/0331714 A1 | 11/2016 | Pahn | |
| 2017/0354666 A1 | 12/2017 | Pahn | |
| 2019/0169110 A1 | 6/2019 | Tsai et al. | |
| 2023/0037062 A1 * | 2/2023 | Pahan | ..................... A61K 31/47 |
| 2023/0255910 A1 * | 8/2023 | Pahan | ..................... A61P 25/00 |
| | | | 514/570 |

(Continued)

FOREIGN PATENT DOCUMENTS

WO    2021170982 A1    9/2021

OTHER PUBLICATIONS

Saltzman et al., J Clin Invest. Aug. 1953;32(8):711-9 (Year: 1953).*

(Continued)

*Primary Examiner* — Jeffrey S Lundgren
*Assistant Examiner* — Anthony Joseph Seitz
(74) *Attorney, Agent, or Firm* — Taft Stettinius & Hollister LLP

(57) ABSTRACT

This disclosure relates to pharmaceutical compositions useful for inhibiting the progression of a neurodegenerative disorder or glycine encephalopathy. The pharmaceutical compositions may include cinnamic acid. The pharmaceutical compositions and formulations may be orally administered to the patient.

13 Claims, 2 Drawing Sheets

(56) References Cited

U.S. PATENT DOCUMENTS

2024/0082184 A1\* 3/2024 Pahan .................. A61K 31/192

OTHER PUBLICATIONS

Pahan K, J Mult Scler (Foster City). 2015;2(3):1000149 (Year: 2015).\*
Boneh et al., vol. 15, Issue 2, 1996, pp. 137-141 (Year: 1996).\*
Extended European Search Report dated Oct. 18, 2022 issued in EP 20763119.3 (9 pages).
Johan L.K. Van Hove, et al., "Metabolic and monogenic causes of seizures in neonates and young infants", Molecular Genetics and Metabolism, Academic Press, Amsterdam, NL, vol. 104, No. 3, Apr. 20, 2011 (Apr. 20, 2011), pp. 214-230, XP028328979, ISSN: 1096-7192, DOI: 10.1016/J. Mymgme.2011.04.020 (17 pp).
Hamosh, et al., "Long-term use of high-dose benzoate and dextramethorphan for the treatment of nonketotic hyperglycinemia", Journal of Pediatrics, Mosby-Year Book, St. Louis, MO, US, vol. 132, No. 4, Apr. 1, 1998 (Apr. 1, 1998), pp. 709-713, XP005692862, ISSN: 0022-3476, DOI: 10.1016/S0022-3476(98)70365-8 (5 pp).
Badenhorst Christoffel Petrus Stephanus, et al., "A new perspective on the importance of glycine conjugation in the metabolism of aromatic acids", Drug Metabolism Reviews, Neva Press, United States, vol. 46, No. 3, Jul. 31, 2014 (Jul. 31, 2014), pp. 343-361, XP009504374, ISSN: 0360-2532, DOI: 10.3109/03602532.2014. 908903 (19 pp).
United States Patent & Trademark Office, The International Search Report and The Written Opinion Issued in corresponding International application No. PCT/US2020/019568, dated Jun. 19, 2020, 3 pp.
Beyoglu, et al., The glycine deportation system and its pharmacological consequences, Pharmacol. Ther., Author manuscript, available in PMC, May 28, 2013 [retrieved on Apr. 17, 2020]. Retrieved from the internet:<URL: https://www.ncbi.nlm.nih.gov/pmc/articles/PMC3665358/pdf/nihms467023.pdf>, pp. 1-39.
Ferreira, et al., Lusosomal storage diseases, Translational Science of Rare Diseases, vol. 2, 2017 [retrieved on Apr. 8, 2020]. Retrieved from the internet:<URL: https://www.ncbi.nlm.nih.gov/pmc/articles/PMC5685203/pdf/trd-2-rd005.pdf>, pp. 1-71.
United States Patent & Trademark Office, The Preliminary Report on Patentability issued in corresponding International application No. PCT/US2020/019568, dated Sep. 2, 2021, 8 pp.

\* cited by examiner

COMPOSITIONS INCLUDING CINNAMIC ACID AND METHODS OF USE THEREOF

RELATED APPLICATIONS

This application is a national stage application of International Application No. PCT/US2020/019568, filed Feb. 25, 2020, which claims priority to and takes the benefit of U.S. Provisional Patent Application No. 62/810,055 filed on Feb. 25, 2019, the contents of which are herein incorporated by reference.

TECHNICAL FIELD

The present disclosure generally relates to pharmaceutical compositions useful for the treatment of diseases and disorders. More particularly, the disclosure relates to pharmaceutical compositions including cinnamic acid and to methods of using such compositions for the treatment of glycine encephalopathy or a neurodegenerative disorder, for example, Krabbe disease.

BACKGROUND

Cinnamon, the brown bark of cinnamon tree, is a commonly used spice and flavoring material for foods such as deserts, candies and chocolates. It has also a long history of being used as a medicine. Medieval physicians used cinnamon in medicines to treat a variety of disorders, including arthritis, coughing, hoarseness and sore throats. In addition to containing manganese, dietary fiber, iron, and calcium, cinnamon contains three major compounds—cinnamaldehyde, cinnamyl acetate and cinnamyl alcohol. After intake, these three active compounds are converted into cinnamic acid by oxidation and hydrolysis. The cinnamic acid is then β-oxidized to benzoate in the liver. The benzoate exists as sodium salt (sodium benzoate) or benzoyl-CoA.

Sodium benzoate is a widely-used food preservative due to its anti-microbial properties. It also has medical importance as a component of Ucephan™, a Food and Drug Administration (FDA)-approved drug used in the treatment for hepatic metabolic defects associated with hyperammonemia, such as urea cycle disorder.

Nonketotic hyperglycinemia (NKH) or glycine encephalopathy is a rare inborn error of metabolism that is caused by deficiency of glycine cleavage system. Most of the cases are caused by mutations in the glycine decarboxylase (GLDC) gene. Due to increase in glycine level in blood and cerebrospinal fluid, NKH is characterized by complex and diverse phenotypes, such as seizures, hypotonia, cognitive impairment, developmental delays, and myoclonic jerks, ultimately leading to apnea and even death in infancy or early childhood. Glycine reacts with benzoate to form hippuric acid, which is excreted through the urine. Sodium benzoate is the only available drug for the treatment of glycine encephalopathy. However, sodium benzoate itself is also quickly excreted out from the body through urine. Therefore, patient must be treated with sodium benzoate several times a day at high doses to maintain its effective concentration in the blood. Due to such a high dose of sodium benzoate, patients often suffer from nausea, vomiting and headache and feel drowsy.

Lysosomal storage diseases (LSDs) are a group of approximately 50 rare inherited metabolic disorders that result from defects in lysosomal function. The symptoms of LSD vary, depending on the particular disorder and other variables like the age of onset, and can be mild to severe. They can include developmental delay, movement disorders, seizures, dementia, deafness and/or blindness. Some people with LSD have enlarged livers (hepatomegaly) and enlarged spleens (splenomegaly), pulmonary and cardiac problems, and bones that grow abnormally.

Lysosomal storage diseases include neurodegenerative disorders, for example, neuronal ceroid lipofuscinosis, Alzheimer's disease, Huntington's disease, Amyotrophic lateral sclerosis (ALS), Krabbe disease, Parkinson's disease, including Parkinson's plus diseases such as multiple system atrophy (MSA), progressive supranuclear palsy (PSP), corticobasal degeneration (CBD) or dementia with Lewy bodies (DLB).

BRIEF SUMMARY

One aspect of the present disclosure relates to compositions and methods for the treatment of diseases such as neurodegenerative disorders and glycine encephalopathy. One embodiment discloses a method for inhibiting the progression of glycine encephalopathy. Another embodiment discloses a method of treating a neurodegenerative disorder, such a Krabbe disease. The method includes administering to a patient in need thereof an effective amount of a pharmaceutical composition including cinnamic acid.

The present disclosure also relates to the manufacture of medicaments, pharmaceutical compositions, and/or formulations. In one aspect, the present disclosure relates to the use of cinnamic acid for the manufacture of a medicament, pharmaceutical composition, and/or formulation for the treatment of neurodegenerative disorders or glycine encephalopathy.

In additional embodiments, the present disclosure relates to a method of using a formulation for inhibiting the progression of a neurodegenerative disorder or glycine encephalopathy. The method comprises administering to a patient in need thereof an effective amount of the formulation, the formulation comprising cinnamic acid and, optionally, at least one of glyceryl dibenzoate and glyceryl tribenzoate.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

FIG. 1B, errors). Results are mean±SEM of five mice per group.

DETAILED DESCRIPTION

Figure 1A:
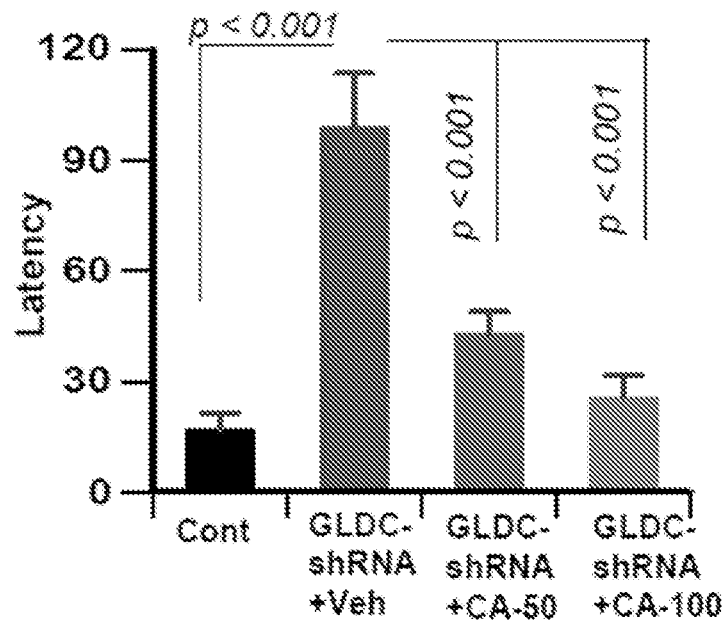
FIG. 1A-1B. Cinnamic acid (CA) treatment improves memory and learning in Lenti-GLDC-shRNA-insulted mice. C57/BL6 mice (8-10 week old) received lentiviral GLDC shRNA ($1\times10^7$ IFU/mouse in 100 μl Hank's Balanced Salt Solution or HBSS) once via tail-vein injection. Therefore, control mice also received 100 μl HBSS via tail-vein. From 7 d after lenti-GLDC shRNA injection, mice were treated with different doses (50 and 100 mg/kg body wt/d) of CA daily via gavage. After 7 d of CA treatment, spatial learning and memory was monitored by Barnes maze (FIG. 1A, latency.

Various embodiments are described below. The relationship and functioning of the various elements of the embodiments may better be understood by reference to the following detailed description. However, embodiments are not limited to those explicitly disclosed herein. It should be understood that in certain instances, details may have been omitted that are not necessary for an understanding of embodiments disclosed herein.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "patient" refers to a human or veterinary patient. In one embodiment, the veterinary patient is a non-human mammalian patient.

As used herein, the term "therapeutic effect" means an effect which induces, ameliorates or otherwise causes an improvement in the pathological symptoms, disease progression or physiological conditions associated with or resistance to succumbing to a disorder, for example glycine encephalopathy, of a patient. The term "therapeutically effective amount" as used with respect to a drug means an amount of the drug which imparts a therapeutic effect to the patient.

As used herein, the term "pharmaceutically acceptable carrier" means a non-toxic, inert solid, semi-solid or liquid filler, diluent, encapsulating material or formulation auxiliary of any type.

Compositions and Method for Treating Neurodegenerative Disorders or Glycine Encephalopathy Although sodium benzoate may be useful for the treatment of certain diseases or disorders, including certain neurodegenerative disorders and glycine encephalopathy, it is quickly metabolized and excreted from the body. The present inventor discloses a pharmaceutical composition including cinnamic acid, which acts as a prodrug, allowing for the sustained-release of sodium benzonate within the body of the patient. In one embodiment, the composition includes a therapeutically effective amount of cinnamic acid. When administered to the patient, cinnamic acid is metabolized by the fatty acid beta-oxidation pathway in the liver to release benzoate. Administration of the cinnamic acid allows a therapeutically effective dose of benzoate is maintained in the blood of the patient.

The neurodegenerative disorder may be, for example, neuronal ceroid lipofuscinosis, Alzheimer's disease, Huntington's disease, Amyotrophic lateral sclerosis (ALS), Krabbe disease, Parkinson's disease, including Parkinson's plus diseases such as multiple system atrophy (MSA), progressive supranuclear palsy (PSP), corticobasal degeneration (CBD) or dementia with Lewy bodies (DLB). In one aspect, the present disclosure provides for the treatment of neurodegenerative disorders, such as Krabbe disease, or glycine encephalopathy by administrating a pharmaceutical composition including cinnamic acid. The present inventor previously disclosed the use of cinnamic acid and other related compounds for the treatment of various diseases or conditions, including lysosomal storage disorders and certain neurodegenerative disorders. See, U.S. patent application Ser. No. 15/527,506, entitled "COMPOSITIONS AND METHODS FOR TREATING LYSOSOMAL DISORDERS", filed May 17, 2017, the contents of which are hereby incorporated by reference.

In one embodiment, the present disclosure provides a treatment for neurodegenerative disorders, such as Krabbe disease, or glycine encephalopathy requiring only a single daily administration of the pharmaceutical composition including cinnamic acid. In other embodiments, the treatment for these diseases includes a twice daily administration of the pharmaceutical composition. In certain embodiments, the pharmaceutical composition disclosed herein also includes glyceryl tribenzoate (also known as tribenzoin) and/or glyceryl dibenzoate. In some aspects, the pharmaceutical compositions disclosed herein include cinnamic acid and both glyceryl tribenzoate and glyceryl dibenzoate. Glyceryl tribenzoate and/or a glyceryl dibenzoate may serve as a slow-release formulation of sodium benzoate as disclosed in U.S. Provisional Patent Application Ser. No. 62/569,251, entitled "THE USE OF A BENZOATE CONTAINING COMPOSITION TO TREAT GLYCINE ENCEPHALOPATHY", filed Oct. 5, 2107, the contents of which are hereby incorporated by reference.

In some embodiments, a treatment is disclosed for inhibiting the progression of neurodegenerative disorders, such as Krabbe disease, or glycine encephalopathy. In glycine encephalopathy, the levels of glycine in the body are elevated. Elevated levels of glycine lead to numerous harmful conditions. Glycine is known to react with benzoate to form hippuric acid. Hippuric acid may then be excreted through the urine.

Sodium benzoate is the only current treatment for glycine encephalopathy but, since it is secreted from the body so quickly, a patient would need to be treated frequently (several times per day) with high doses of the compound. For example, an infant may need to be treated about every 6 hours at a dose of about 2.8 gm/d. Due to such a high doses, patients taking the treatment are often drowsy and experiencing other problems. However, administration of cinnamic acid can serve as a pro-drug enabling a clinically effective level of benzoate to be maintained in the body of the patient.

In the treatment methods contemplated by the present disclosure, the composition including cinnamic acid, and optionally glyceryl tribenzoate and/or glyceryl dibenzoate, may be used alone or in compositions together with a pharmaceutically acceptable carrier or excipient. Some examples of materials which can serve as pharmaceutically acceptable carriers are sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols; such a propylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator. Other suitable pharmaceutically acceptable excipients are described in "Remington's Pharmaceutical Sciences," Mack Pub. Co., New Jersey, 1991.

In certain embodiments, the composition may be orally administered to human and veterinary patients. In certain embodiments, the patient is a human patient, for example a pediatric human patient. The patient may be, for example, less than one, two or three years of age. The pharmaceutical composition may be administrated orally. Alternatively, the composition is administered by a subcutaneous, intra-articular, intradermal, intravenous, intraperitoneal or intramuscular route. In some embodiments, the composition is administered one per day. In other embodiments, the composition is administered two, three, four or more time per day.

The composition may be formulated for administration and methods of formulation are well known in the art (see, for example, Remington: *The Science and Practice of Pharmacy*, Mack Publishing Company, Easton, Pa., 19th Edition (1995)).

Any of the formulations disclosed herein can be used for treating/inhibiting the progression of neurodegenerative disorders, such as Krabbe disease, or glycine encephalopathy. In some embodiments, the present disclosure relates to a method of using a formulation for inhibiting the progression of neurodegenerative disorders, such as Krabbe disease, or glycine encephalopathy. The method comprises administering to a patient in need thereof an effective amount of the formulation. In some embodiments, the formulation includes 1 gram/1 ml of cinnamic acid. In some embodiments, the formulation may also include glyceryl dibenzoate and/or glyceryl tribenzoate.

In some embodiments, the formulations may be sustained-release formulations, meaning that they release cinnamic acid steadily over an extended period of time. In other embodiments, the formulations may be delayed-release formulations, meaning that they release cinnamic acid at a time later than that immediately following its administration.

In some embodiments, the formulations are administered orally to the patient. In some embodiments, the total daily dose could be divided into multiple doses, such as two or three substantially equal doses, and administered at different times throughout a day. In some embodiments, a patient can be administered from about 1.25 grams to about 15 grams of cinnamic acid per day, based on a 50 kg patient.

Pharmaceutical compositions for use in accordance with the present disclosure can be in the form of sterile, non-pyrogenic liquid solutions or suspensions, coated capsules, lyophilized powders, or other forms known in the art.

Solid dosage forms for oral administration include capsules, tablets, pills, powders, and granules. In such solid dosage forms, the active compound is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, acetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents.

Solid compositions of a similar type may also be employed as fillers in soft and hard-filled gelatin capsules using such excipients as lactose or milk sugar as well as high molecular weight polyethylene glycols and the like.

The solid dosage forms of tablets, dragees, capsules, pills, and granules can be prepared with coatings and shells such as enteric coatings and other coatings well known in the pharmaceutical formulating art. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes.

The active compounds can also be in micro-encapsulated form with one or more excipients as noted above. The solid dosage forms of tablets, dragees, capsules, pills, and granules can be prepared with coatings and shells such as enteric coatings, release controlling coatings and other coatings well known in the pharmaceutical formulating art. In such solid dosage forms the active compound may be admixed with at least one inert diluent such as sucrose, lactose or starch. Such dosage forms may also comprise, as is normal practice, additional substances other than inert diluents, e.g., tableting lubricants and other tableting aids such a magnesium stearate and microcrystalline cellulose. In the case of capsules, tablets and pills, the dosage forms may also comprise buffering agents. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes.

Liquid dosage forms for oral administration include pharmaceutically acceptable emulsions, microemulsions, solutions, suspensions, syrups and elixirs. In addition to the active compounds, the liquid dosage forms may contain inert diluents commonly used in the art such as, for example, water or other solvents, solubilizing agents and emulsifiers such as ethyl alcohol, isopropyl alcohol, ethyl carbonate, EtOAc, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can also include adjuvants such as wetting agents, emulsifying and suspending agents, sweetening, flavoring, and perfuming agents.

Effective amounts of the compositions of this disclosure generally include any amount sufficient to inhibit (e.g. slow or stop) the progression of neurodegenerative disorders or glycine encephalopathy. The amount of cinnamic acid that may be combined with the carrier materials to produce a single dosage form will vary depending upon the host treated and the particular mode of administration. It will be understood, however, that the specific dose level for any particular patient will depend upon a variety of factors including the activity of the specific compound employed, the age, body weight, general health, sex, diet, time of administration, route of administration, rate of excretion, drug combination, and the severity of the particular disorder or disease undergoing therapy. The therapeutically effective amount for a given situation can be readily determined by routine experimentation and is within the skill and judgment of the ordinary clinician.

According to the methods of treatment of the present disclosure, progression of the disorder is slowed or stopped in a patient, such as a human or veterinary patient, by administering to the patient an effective amount of the cinnamic acid in such amounts, and for such time as is necessary, to achieve the desired result. An amount of a compound that is effective to slow or stop the progression of a disease or disorder may refer to a sufficient amount of the compound to treat the disease or disorder at a reasonable benefit/risk ratio applicable to any medical treatment.

It will be understood, however, that the total daily usage of the compounds and compositions of the present disclosure will be decided by the attending physician within the scope of sound medical judgment. The specific therapeutically effective dose level for any particular patient will depend upon a variety of factors including the disease or disorder being treated and the severity of the disorder; the activity of the specific compound employed; the specific composition employed; the age, body weight, general health, sex and diet of the patient; the time of administration, route of administration, and rate of excretion of the specific compound employed; the duration of the treatment; drugs used in combination or coincidental with the specific compound employed; and like factors well known in the medical arts.

The therapeutic agents of the combination therapies can be administered to a subject in the same pharmaceutical composition. Alternatively, the therapeutic agents of the combination therapies can be administered concurrently or sequentially to a subject in separate pharmaceutical compositions. The therapeutic agents may be administered to a subject by the same or different routes of administration.

The "therapeutically effective amount" or dose of a compound of the present disclosure, such as cinnamic acid, to be administered to warm-blooded animals, such as humans, may vary depending upon the disorder to be treated. In connection with Krabbe disease or glycine encephalopathy, the effective amount of the cinnamic acid may be from approximately 1.25 g to approximately 15 g per day, based on a 50 kg patient. For example, the effective amount may be about 1.25 g, about 2.5 g, about 4 g, about 5 g, about 7.5 g, about 10 g, or about 12 g per 50 kg patient, per day. In some embodiments, the effective amount may be from about 1.25 g to about 10 g, from about 1.25 g to about 7 g, from about 1.25 g to about 4 g, or from about 1.25 g to about 2 g per 50 kg patient, per day.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

EXAMPLES

Treatment of C57/BL6 Mice with Lentiviral Glycine Decarboxylase (GLDC) shRNA:

C57/BL6 mice (8-10 week old) received lentiviral GLDC shRNA ($1\times10^7$ IFU/mouse in 100 µl Hank's Balanced Salt Solution or HBSS) once via tail-vein injection (FIG. 1). Therefore, a group of control mice received only 100 µl HBSS via tail-vein injection.

Oral Administration of Cinnamic Acid:

From 7 d after lenti-GLDC shRNA injection, mice were treated with different doses (50 and 100 mg/kg body wt/d) of cinnamic acid daily via gavage. Cinnamic acid (Sigma) was solubilized in 100 µl 0.5% methyl cellulose before gavage. Therefore, one group of lenti-GLDC shRNA-insulted mice were also treated with 100 µl 0.5% methyl cellulose as vehicle control.

Figure 1B:
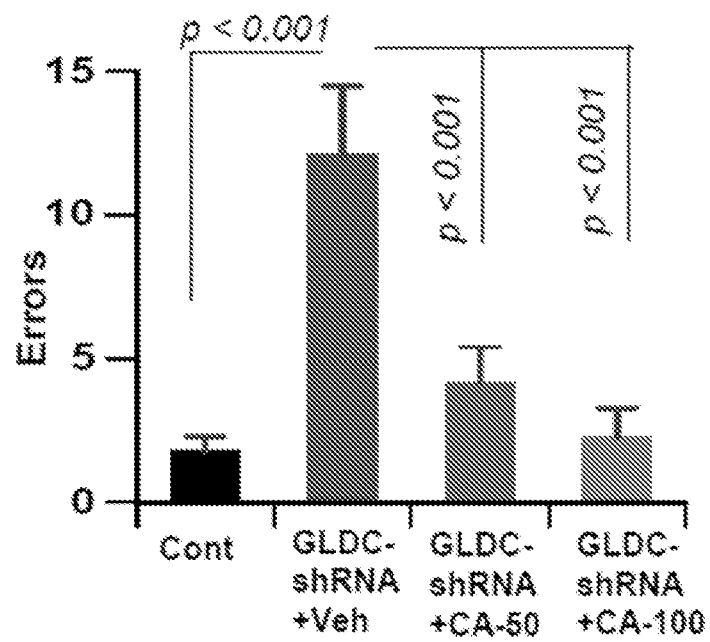

After 7 d of cinnamic acid treatment, mice were monitored for spatial learning and memory by Barnes maze (FIG. 1). Significant cognitive impairment was seen in lenti-GLDC shRNA-insulted mice as compared to HBSS-treated control mice (FIG. 1A-B). Lenti-GLDC shRNA-insulted mice took longer time to find the correct hole (FIG. 1A) and made more errors (FIG. 1B) as compared to HBSS-treated control mice. However, oral cinnamic acid at both doses tested significantly reduced latency and errors of lenti-GLDC shRNA-insulted mice in reaching the target hole (FIG. 1A-B), suggesting that oral cinnamic acid also increased cognitive functions of lenti-GLDC shRNA-insulted mice.

On 14 d of treatment, mice were sacrificed and level of glycine was measured in brain (cortex).

Figure 2:
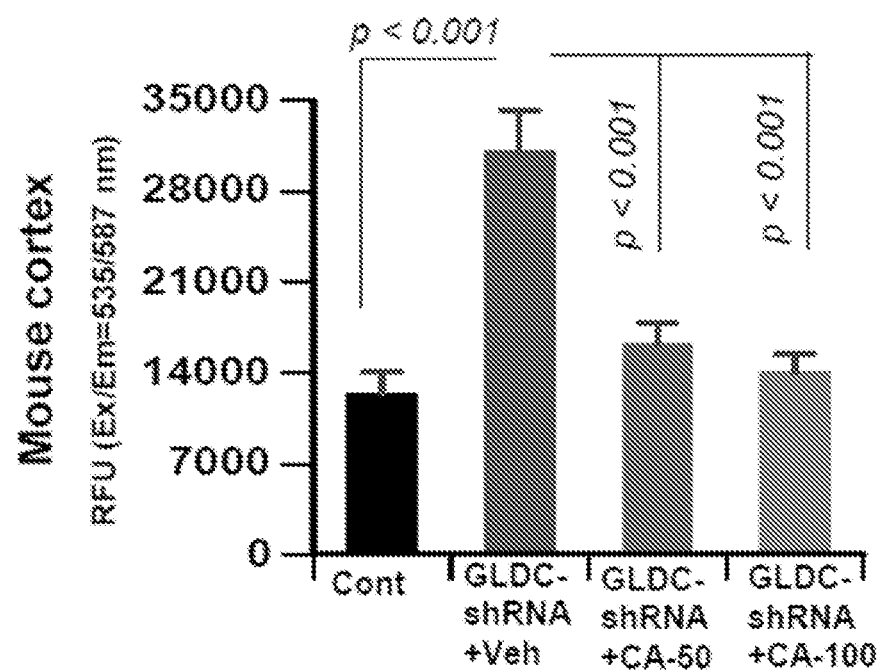
FIG. 2. Cinnamic acid (CA) treatment reduces the level of glycine in the cortex of lenti-GLDC-shRNA-insulted mice. C57/BL6 mice (8-10 week old) received lentiviral GLDC shRNA (1×10$^7$ IFU/mouse in 100 µl HBSS) once via tail-vein injection. Therefore, control mice also received 100 µl HBSS via tail-vein. From 7 d after lenti-GLDC shRNA injection, mice were treated with different doses (50 and 100 mg/kg body wt/d) of CA daily via gavage. After 14 d of CA treatment, the level of glycine was measured in cortex by using a fluorometric assay kit (Biovision). Each mouse sample was run in triplicate. Results are mean±SEM of five mice per group.

As expected, we observed markedly increased levels of glycine in the cortex of lenti-GLDC shRNA-insulted mice as compared to control mice receiving only HBSS (FIG. 2). However, oral cinnamic acid treatment strongly inhibited the level of glycine in the cortex of lenti-GLDC shRNA-insulted mice (FIG. 2). Even at a dose of 50 mg/kg body wt/d, cinnamic acid was very effective in lowering the level of glycine (FIG. 2).

We did not notice any side effect (e.g. hair loss, weight loss, diarrhea, untoward infection, etc.) in any of the mice used during cinnamic acid treatment at doses of 50 to 100 mg/kg body wt/d. Therefore, at these doses, cinnamic acid should not exhibit any toxic effects. Together, these data suggest that cinnamic acid may have therapeutic implication in NKH.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for treating glycine encephalopathy, comprising: administering to a human patient in need thereof a therapeutically effective amount of a pharmaceutical composition comprising cinnamic acid, wherein the human patient is less than three years old, wherein treating results in an increase in cognitive function in the human patient compared to an untreated human patient.

2. The method of claim 1, wherein the pharmaceutical composition is administered to the human patient one time per day.

3. The method of claim 1, wherein the effective amount is from about 1.25 grams to about 15 grams per day, based on a 50 kg human patient.

4. The method of claim 1, wherein the pharmaceutical composition is formulated together with a pharmaceutically acceptable carrier or excipient.

5. The method of claim 1, wherein the pharmaceutical composition is administered orally.

6. The method of claim 5, wherein the pharmaceutical composition is administered to the patient one time per day.

7. The method of claim 1, wherein the composition is selected from the group consisting of a sustained-release composition and a delayed-release composition.

8. The method of claim 1, wherein the human patient is less than two years of age.

9. The method of claim 1, wherein the human patient is less than one year of age.

10. The method of claim 1, further comprising administering to the human patient a composition comprising at least one of glyceryl tribenzoate and glyceryl dibenzoate.

11. The method of claim 10, wherein the composition comprising at least one of glyceryl tribenzoate and glyceryl dibenzoate is administered orally to the human patient.

12. The method of claim 1, further comprising administering to the human patient a composition comprising glyceryl dibenzoate.

13. The method of claim 1, further comprising administering to the human patient a composition comprising glyceryl tribenzoate.

* * * * *